Figure 1:
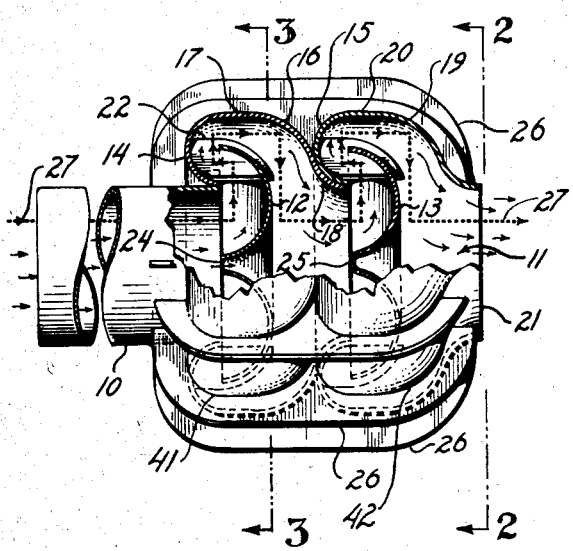

April 9, 1935.  C. E. HATHORN  1,997,298

MUFFLER

Filed May 31, 1932

INVENTOR.
Charles E. Hathorn
BY
ATTORNEY.

Patented Apr. 9, 1935

1,997,298

UNITED STATES PATENT OFFICE 1,997,298

MUFFLER

Charles E. Hathorn, Hempstead, N. Y., assignor to Curtiss Aeroplane & Motor Company, Inc., a corporation of New York Application May 31, 1932, Serial No. 614,316

3 Claims. (Cl. 137—160)

My invention relates to heat engines and more particularly to devices for muffling the noise of the hot gas exhausted from heat engines.

An object of the invention is to provide a compact and efficient muffler for hot exhaust gases, which by its construction will be inherently well cooled.

An additional object of my invention is to provide a muffler which by its action will build up a minimum of back pressure in an exhaust system.

A further object of my invention is to provide a muffler which simultaneously reduces the pressure and temperature of the exhaust gases so that a minimum of noise emanates with the gases discharged.

A still further object of my invention is to provide a muffler which may be effectively used on engines of large displacement, such as aircraft engines, and in the construction of which its weight will be minimized.

Another object of the invention is to provide a standardized muffling unit, so that a plurality of such similar units may be assembled in series whereby a muffler may be provided to meet the requirements of small or large engines.

There have been few satisfactory muffling devices for aircraft engines developed. Those designs which are partly successful all make use of well known principles of cooling and pressure reduction of the exhaust gas so that the hot exhaust gas meets the outside air at a low temperature and at a pressure approaching that of the atmosphere. A principal difficulty, in designing an effective muffler for aircraft engines of large displacement, is to provide a device which will adequately muffle the exhaust noise but at the same time will be compact, light in weight, and so constructed that it offers a minimum of resistance to the passage of the aircraft through the air. It has been difficult in the past to attain adequate cooling of and adequate silencing capacity in the muffler without a redundance of parasitic surface area exposed to the slipstream of the aircraft.

By the construction of my muffler I am able to rapidly dissipate heat and rapidly reduce exhaust gas pressure by providing a structure which inherently causes the exhaust gases to change direction frequently and to impinge upon a comparatively large but compact surface so that they are adequately cooled.

Further advantages and objects of the invention will be apparent from a consideration of the appended drawing and from a reading of the subjoined specification, which show the present preferred embodiment thereof.

Figure 2:
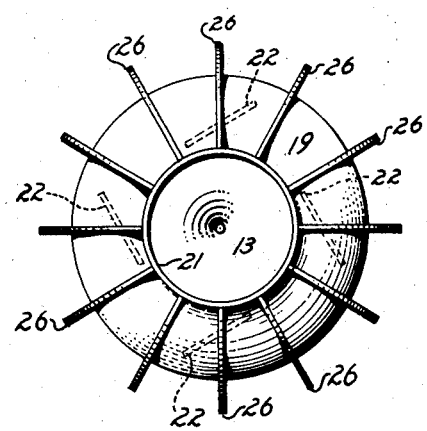
Figure 3:
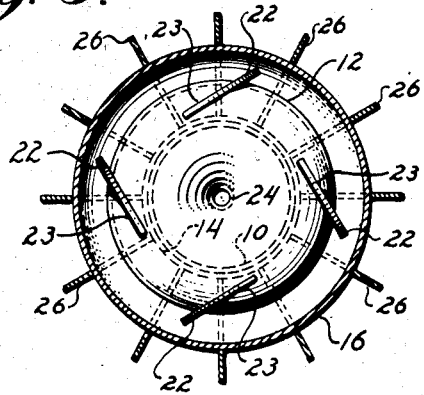

In the drawing, wherein similar numbers indicate similar parts:

Fig. 1 is a side elevation of the invention, partly broken away;
Fig. 2 is a section on the line 2—2 of Fig. 1;
Fig. 3 is a section on the line 3—3 of Fig. 1; and
Fig. 4 is a perspective view of an alternative embodiment of the invention.

Figure 4:
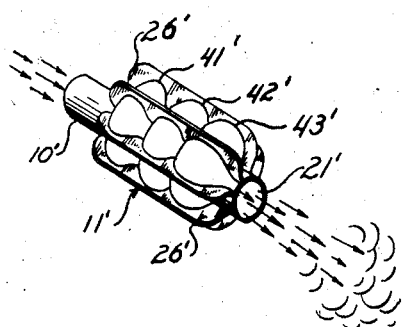

Describing my invention in detail, and referring to Fig. 4 of the drawing, 11' is a complete muffler comprising an entrance conduit 10', and three muffling units 41', 42' and 43' extending from the conduit 10'. The exhaust gas passing through the muffler leaves the muffler at 21'. Around the muffling units 41', 42' and 43' are arranged cooling fins 26', which comprise flat metallic strips extending radially with respect to the muffler axis, and longitudinally along the muffler. The fins 26' are so formed that their inner edges are complementary to the outer contours of the muffler units 41', 42' and 43'. They likewise form a structural element of the muffler 11', by holding the muffling units 41', 42' and 43' in their proper position with respect to each other. The manner in which this is accomplished will be described later.

Each muffling unit 41', 42' and 43' of the muffler 11' is similar in form and construction. Two such units may be assembled as shown in Fig. 1, three may be used as in Fig. 4, or additional units may be assembled as required.

A detailed description of the unit 41 (Fig. 1) will likewise describe 42, and the units 41', 42' and 43'. The muffling unit 41 comprises an annularly cupped ring 14 having the diameter of its opening similar to the outside diameter of the inlet conduit 10. The inlet conduit 10 is inserted in the ring 14 and is fastened thereto. The ring 14 is placed over the inlet conduit 10 so that its concave surface faces away from the direction of flow of the exhaust gas as in the conduit 10. Baffle plates 22 are fastened to the inner cupped portion of the ring 14 in a plane parallel to the axis of the ring 14, but offset angularly from a radius thereof. An annularly cupped disc 12, provided with slots 23 which engage the baffles 22, is placed so that its concave surface faces the incoming exhaust gases from the conduit 10. The outside diameter of the disc 12 is substantially less than the outside diameter of the ring 14, but greater than the diameter of the inlet conduit 10. The disc 12 may be attached to the baffles 22 by welding or other suitable means. The baffles 22 thereby form a support, holding the disc 12 in fixed spaced relation to the ring 14. The disc 12 may have formed therein a central opening 24, or its central portion may be closed as shown by 25 in the otherwise similar disc 13 of the muffling unit 42. A funnel shaped member 16 is attached by welding or other suitable means to the outer periphery of the ring 14 as at 17. The member 16 is so formed that its inner surface provides a smooth continuation of the contour of the ring 14. The member 16 converges inwardly to the portion 18, which is formed with a radius such that the outer surface of the portion 18 of the member 16 is complementary to the outer surface of the inner portion of the ring 14. By this construction, that portion of the muffling unit formed by the ring 14 and the funnel member 16 embraces the disc 12. The similarly constructed muffling unit 42 may be assembled on the muffling unit 41, the ring 15 of the unit 42 engaging the portion 18 of the funnel member 16 of the unit 41. Additional similar muffling units may be similarly applied to the unit 42 to build up a muffler having three or more muffling units.

In the muffler 11, two muffling units 41 and 42 are assembled as above described. The cooling fins 26 span both the muffling units and each fin is formed so that its inner edge conforms with the contour of the muffling units 41 and 42. The fins are arranged in planes passing through the axis of the muffler 11. The fins 26 are attached to the muffler by welding or other suitable means, and form a structural element of the muffler 11, holding the muffling units 41 and 42 in their proper relation to each other.

When additional muffling units are assembled, the fins 26 would be formed to span all the muffling units, as shown in Fig. 4.

The action of the muffler is as follows: Hot exhaust gases under a pressure greater than atmospheric pass from the engine thru suitable piping and enter the muffler by means of the inlet conduit 10. The path of the exhaust gas in its passage through the muffler is represented by the dotted line 27. The gas, entering the muffler, impinges upon the disc 12. Following the curvature of the disc 12, the gas is diverted radially outward and then is reversed in its flow. As the gas leaves the disc 12 and impinges upon and follows the contour of the ring 14, it encounters the baffles 22. These, by their radially offset position, impart a spiral motion to the gas. The gas, impinging upon the inner portion of the cupped ring 14, again is diverted radially outward and reversed in its flow, following along the inner surface of the funnel member 16. The gas is again changed in direction and leaves the muffling section 41 through the opening formed by the inner portion 18 of the funnel member 16. Gas leaving the unit 41 immediately enters the unit 42 since it is adjacent to the unit 41. The passage of gas through the unit 42 is similar to its passage through the unit 41.

In its passage through the muffler, the exhaust gas is frequently reversed in direction and is caused to impinge repeatedly upon the outer surface of the muffling unit. Heat is copiously transferred from the gas to the muffling unit and the dissipation of this heat from the muffling unit is effected by the passage of air thereover. Likewise, heat is transmitted to the cooling fins 26 which are likewise cooled by their contact with the outside air. Primarily by adequate cooling of the gases, with consequent reduction in volume, the pressure of exhaust gas is very materially reduced, so that upon its exhaust into the atmosphere, the pressure and temperature of the gas approach that of the outside air with consequent minimization of noise.

The succeeding stages of the muffling device as 42' and 43' in Fig. 4 may, if desired, be made smaller in diameter through the fact that the gases in their passage through successive stages become cooler and hence are reduced in volume.

It will be noted that the passage of the gas through the muffler is at all times carried in a smooth path as provided by the smoothly curved surfaces of the disc 12, the ring 14 and the funnel member 16. This path is at all times free and open, and hence the back pressure caused by restrictions within the muffler is minimized by said free and unrestricted passage of exhaust gas.

It will be seen also that by the repetition of the stages of the muffler, each stage may use the same form of component parts as those used in the preceding stage. This allows for the construction of mufflers for small and large engines simply by increasing the number of muffling units. Likewise it will be seen that the overall diameter of the muffling unit is only about twice as great as the diameter of the inlet conduit 10, thereby causing only a slight increase in the parasite resistance which the muffler might offer in the flight of an aircraft.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A muffling device for engine exhaust gases including an entrance conduit, a series of spaced annularly cupped discs having their concave surfaces facing said entrance conduit, a series of annularly cupped rings, each having its concave surface facing the concave face of one of said discs, substantially funnel shaped member joining the outer periphery of each of said rings with the inner periphery of the succeeding ring, and baffle plates between said discs and said rings forming the sole means for holding said discs in fixed spaced relation with respect to said rings.

2. A muffling device for engine exhaust gases including an entrance conduit, a series of spaced annularly cupped discs having their concave surfaces facing said entrance conduit, a series of annularly cupped rings, each having its concave surface facing the concave face of one of said discs, substantially funnel shaped members joining the outer periphery of each of said rings with the inner periphery of the succeeding ring, and radially offset baffle plates between said discs and said rings forming the sole means for holding said discs in fixed spaced relation to said rings and by means of which baffles a whirling motion is imparted to said exhaust gases in their passage through said muffling device.

3. In a muffling device having a cupped ring and a cupped disk adapted to be held in spaced concentric relation, exhaust gases being adapted to enter the opening of said ring to impinge on said disk and to flow substantially radially outward; a plurality of substantially flat plates forming the sole means for holding said disk and ring in spaced relation, said plates being substantially parallel to and radially offset from the axis of said ring and disk for imparting a whirling motion to gas flowing therebetween.

CHARLES E. HATHORN.